(12) United States Patent
Chien et al.

(10) Patent No.: US 12,315,112 B2
(45) Date of Patent: May 27, 2025

(54) IMAGE DETECTION METHOD, COMPUTING DEVICE, AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 326 days.

(21) Appl. No.: 17/832,939

(22) Filed: Jun. 6, 2022

(65) Prior Publication Data

US 2023/0230217 A1    Jul. 20, 2023

(30) Foreign Application Priority Data

Jan. 19, 2022    (CN) .................. 202210062305.X

(51) Int. Cl.
| | | |
|---|---|---|
| G06T 5/20 | (2006.01) | |
| G06T 5/40 | (2006.01) | |
| G06T 5/50 | (2006.01) | |
| G06T 5/90 | (2024.01) | |
| G06T 7/00 | (2017.01) | |
| G06T 7/13 | (2017.01) | |

(52) U.S. Cl.
CPC .................. *G06T 5/20* (2013.01); *G06T 5/40* (2013.01); *G06T 5/50* (2013.01); *G06T 5/90* (2024.01); *G06T 7/001* (2013.01); *G06T 7/13* (2017.01); *G06T 2207/20021* (2013.01); *G06T 2207/20028* (2013.01); *G06T 2207/20032* (2013.01); *G06T 2207/20081* (2013.01); *G06T 2207/20084* (2013.01); *G06T 2207/30108* (2013.01); *G06T 2207/30168* (2013.01)

(58) Field of Classification Search
CPC .... G06T 5/20; G06T 5/40; G06T 5/50; G06T 5/90; G06T 7/001; G06T 7/13; G06T 2207/20021; G06T 2207/20028; G06T 2207/20032; G06T 2207/20081; G06T 2207/20084; G06T 2207/30108; G06T 2207/30168; G06T 5/70; G06T 5/92; G06T 5/94; G06T 2207/30144; G06T 2207/30176; G06T 7/0004; G06V 10/462; G06V 10/50; G06V 10/82; G06V 10/98; Y02P 90/30

See application file for complete search history.

(56) References Cited

U.S. PATENT DOCUMENTS

2020/0234420 A1 *    7/2020    Liu .......................... G06T 5/50

FOREIGN PATENT DOCUMENTS

| CN | 107403422 | 3/2020 | |
|---|---|---|---|
| CN | 110866911 A * | 3/2020 | .......... G06K 9/4604 |

(Continued)

*Primary Examiner* — Oneal R Mistry
*Assistant Examiner* — Justin Philip Cascais
(74) *Attorney, Agent, or Firm* — ScienBiziP, P.C.

(57) ABSTRACT

An image detection obtains original image. The original image is corrected to obtain a corrected image. Median filtering is performed on the corrected image to obtain a filtered image. A contrast of the filtered image is adjusted to obtain an adjusted image. Bilateral filtering is performed on the adjusted image to obtain an enhanced image. Defects in the enhanced image is detected. The method can detect defects in images accurately and efficiently.

13 Claims, 3 Drawing Sheets

(56) References Cited

FOREIGN PATENT DOCUMENTS

| | | | | |
|---|---|---|---|---|
| CN | 107657603 | | 7/2020 | |
| CN | 113888436 A | * | 1/2022 | ............... G06T 5/20 |
| CN | 115298539 A | * | 11/2022 | |
| CN | 113888436 B | * | 4/2024 | ............... G06T 5/20 |
| TW | 202127372 | | 7/2021 | |

* cited by examiner

IMAGE DETECTION METHOD, COMPUTING DEVICE, AND STORAGE MEDIUM

FIELD

The subject matter herein generally relates to image processing, specifically an image detection method, a computing device, and a storage medium.

BACKGROUND

A method for detecting defects of products is to detect whether there are defects (such as misprinted letters and numbers) appearing in images of the products. However, detection of such defects in images is sometime inaccurate.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure. However, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Figure 1:
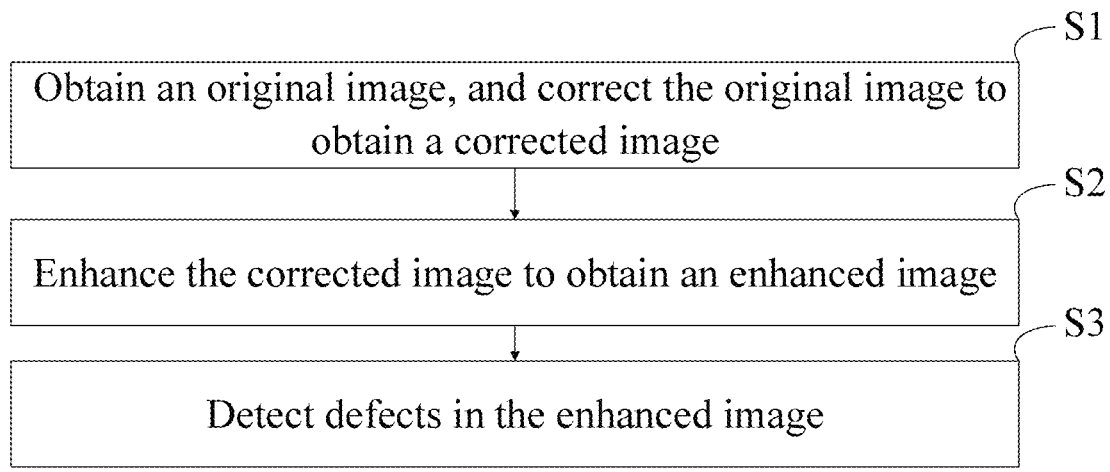
FIG. 1 is a flowchart of an image detection method provided in one embodiment of the present disclosure.

FIG. 1 is a flowchart of an image detection method in one embodiment. The method can detect defects in images accurately and efficiently. According to different requirements, the order of the blocks in the flowchart may be changed, and some blocks may be omitted.

Figure 2:
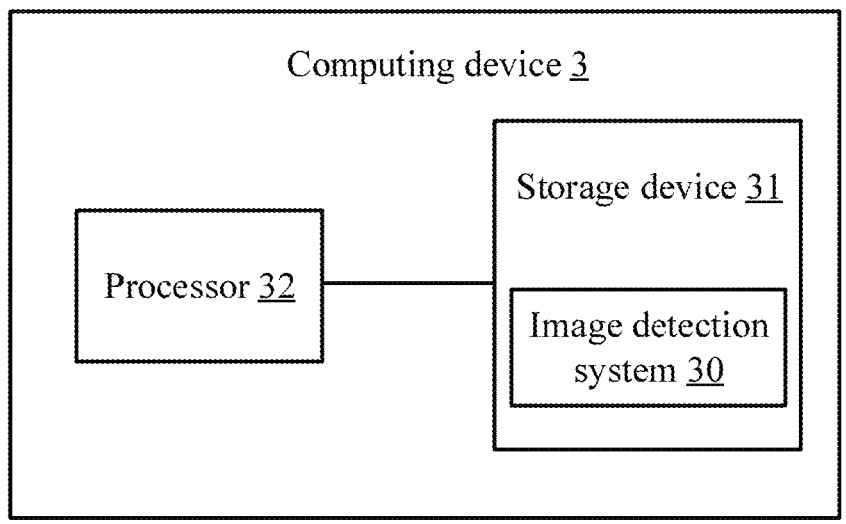
FIG. 2 is a block diagram of a computing device implementing the method in one embodiment of the present disclosure.

The method may be executed by a computing device (e.g., computing device 3 in FIG. 2). The method can be integrated in the computing device 3, or in a software development kit (SDK) run in the computing device 3.

In block S1, the computing device obtains an original image of a product, and corrects the original image to obtain a corrected image.

In one embodiment, the computing device obtains the original image in response to a user input. The computing device can obtain one original image or multiple original images, and apply the method to process each original image. A user can transmit the original image, such as uploading or downloading the original image. The user can input the original image through an application interface or a graphic interface.

The original image may be pre-stored in a storage device of the computing device or connected to the computing device. The original image may be an image of a product. In one embodiment, the original image contains printed characters associated with the product.

In one embodiment, the computing device obtains a reference image without defects, and corrects the original image according to the reference image.

The computing device may obtain the reference image which is without defects in response to a user input, and correct the original image with reference to the reference image. The reference image may be pre-stored in a storage device of the computing device or connected to the computing device. The reference image may be an image of a product which is flawless, such as an image of a product with perfectly-formed printed characters (a golden sample).

In one embodiment, the computing device performs geometric correction on the original image using a scale-invariant feature transform (SIFT) algorithm. The geometric correction compensates for distortion of images (such as the original image).

In performing the geometric correction on the original image, the computing device may obtain a plurality of first feature points in the original image (for example, points where texture changes drastically, corner points, intersections of straight lines, and isolated points in simple areas in the original image) and a plurality of second feature points in the reference image (for example, points where texture changes drastically, corner points, intersections of straight lines, and isolated points in simple areas in the reference image). The computing device establishes a relationship between the first feature points and the second feature points using a matrix matching algorithm, so that a plurality of first feature point pairs are obtained. Each first feature point pair include a first feature point and a corresponding second feature point. The computing device removes feature point pairs that are incorrectly matched using a random sample consensus (RANSAC) algorithm, so that only first target feature point pairs that are correctly matched are obtained. Based on the first target feature point pairs, a first correction matrix of the original image is calculated. Based on the first correction matrix, the computing device corrects the original image.

In one embodiment, a size of the corrected original image and a size of the reference image are the same.

In block S2, the computing device enhances the corrected image to obtain an enhanced image.

Figure 3:
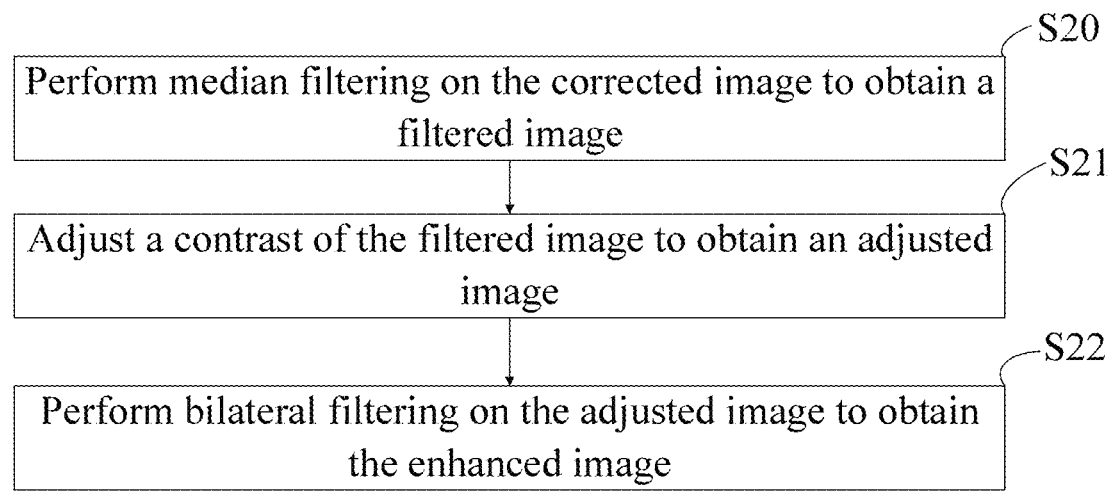
FIG. 3 is detailed flowchart of S2 of the method in FIG. 1.

FIG. 3 is detailed flowchart of S2 of the method in FIG. 1. The detailed flowchart of FIG. 3 includes blocks S20-S22.

In block S20, the computing device performs median filtering on the corrected image to obtain a filtered image.

In one embodiment, the computing device slides a sliding window in the corrected image, and updates pixel values of the corrected image according to the sliding window. The computing device further processes edges of the corrected image.

The computing device may set a shape of the sliding window. For example, the sliding window may be set as a square, a line, a circle, a cross, an annulus, and the like. A size of the sliding window can be fixed or changed. The sliding window can accommodate an odd number of pixels.

The computing device slides the sliding window in the corrected image in a preset direction (for example, from left to right and from top to bottom). For each sliding, the computing device updates a pixel value of a pixel of the corrected image (such as a pixel at a center of the sliding window) to a median value of pixel values of pixels in the sliding window. The median filtering can eliminate noise (e.g., salt and pepper noise, impulse noise, etc.) in the corrected image.

When processing edges of the corrected image (for example, four sides of a rectangular image), the computing device may update a pixel value of a pixel in the edges ("edge pixel") with a pixel value of a pixel closest to the edge pixel.

Figure 4:
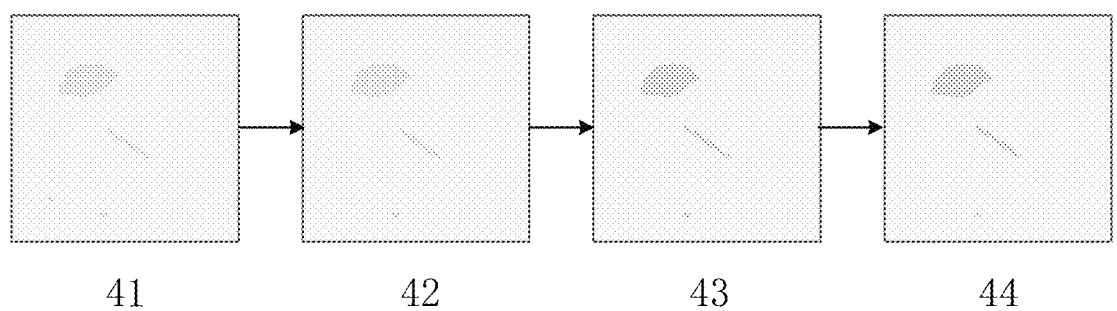
FIG. 4 shows median filtering performed on a corrected image to obtain a filtered image, contrast of the filtered image adjusted to obtain an adjusted image, and bilateral filtering performed on the adjusted image to obtain the enhanced image.

FIG. 4 shows median filtering performed on a corrected image (41) to obtain a filtered image (42).

In block S21, the computing device adjusts a contrast of the filtered image to obtain an adjusted image.

In one embodiment, the computing device obtains a brightness histogram of the filtered image, sets a first threshold K, updates the brightness histogram according to the first threshold K, and uses a histogram equalization algorithm to adjust the contrast of the filtered image according to updated brightness histogram.

A horizontal axis of the brightness histogram represents pixel value (denoted as v), and a vertical axis of the brightness histogram represents pixel quantity (denoted as $y_v$).

In one embodiment, the computing device determines a pixel quantity $y_v$ corresponding to a pixel value v that is greater than the first threshold K according to the brightness histogram, and calculates an updated pixel quantity $y'_v$ as follows to obtain the updated brightness histogram:

$$y'_v = \frac{\sum_{K<y_v}(y_v - K)}{256} + y_v.$$

A horizontal axis of the updated brightness histogram represents pixel value, and a vertical axis of the updated brightness histogram represents updated pixel quantity.

The first threshold K can be proportional to a total pixel quantity of the filtered image. In one example, a width of the filtered image is 640 ((pixels), a height of the filtered image is 480 (pixels), the total pixel quantity of the filtered image is 640×480=307200, and the first threshold K is 2000.

In one embodiment, the computing device calculates a cumulative distribution function cdf(v).

In one embodiment, the cumulative distribution function can be calculated as follows: cdf(v)=$\sum_0^v y'_v$.

The computing device uses the cumulative distribution function cdf(v) to update the pixel value v to obtain an updated pixel value k(v):

$$k(v) = \text{round}\left(\frac{cdf(v)-1}{M \times N} \times 255\right),$$

where round denotes a round-off function, M denotes a width of the filtered image (e.g., 640), and N denotes a height of the filtered image (e.g., 480).

FIG. 4 also shows contrast of the filtered image (as in 42) adjusted to obtain an adjusted image (as in 43).

In block S22, the computing device performs bilateral filtering on the adjusted image to obtain the enhanced image.

Bilateral filtering protects edges of an image. A commonly used bilateral filtering is Gaussian filtering. The Gaussian filtering is performed based on a normal distribution of an image. The Gaussian filtering calculates weights according to distances between pixels in a convolution template and target pixels in the image, so as to blur the image while smoothing the edges of the image. In order to preserve details of the edges, more weights related to the pixels in the convolution template and the target pixels can be used in the bilateral filtering. A color difference weight $G_r$ and a spatial distance weight $G_S$ can be used to obtain a bilateral filter $I_p$.

$$I_p = \frac{1}{W_p}\sum_{q \in S} G_S(\|p-q\|)G_r(|I_p - I_q|)I_q,$$

$$\text{and } W_p = \sum_{q \in S} G_S(\|p-q\|)G_r(|I_p - I_q|),$$

where p represents a target pixel and S represents a pixel set in a filtering window (such as the sliding window described above), q represents a pixel in the pixel set around the target pixel, $I_q$ represents a pixel value of q, and $W_p$ represents a weight sum of each pixel value in the filter window. $W_p$ is used for normalization of weights.

In a flat area of the adjusted image, $G_r$ of each pixel is about the same, and $G_S$ dominates the filtering effect. In an edge area of the adjusted image, $G_r$ on the same side of an edge is about the same, and is much larger than $G_r$ on the other side of the edge. Weights of pixels on the other side have little effect on the filtering result. Therefore, edge information is protected.

FIG. 4 also shows bilateral filtering performed on the adjusted image (43) to obtain the enhanced image (44).

In block S3, the computing device detects defects in the enhanced image.

Figure 5:
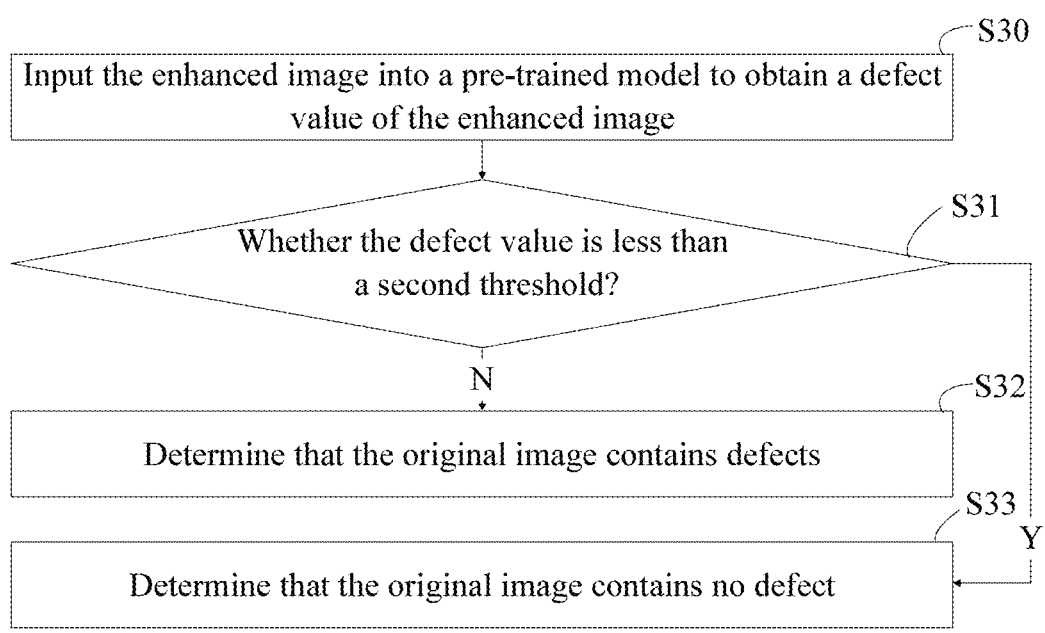
FIG. 5 is a detailed flowchart of S3 of the method in FIG. 1.

FIG. 5 is a detailed flowchart of S3 of the method in FIG. 1. The detailed flowchart of FIG. 5 includes blocks S30-S33.

In block S30, the computing device inputs the enhanced image into a pre-trained detection model to obtain a defect value of the enhanced image.

In one embodiment, the computing device uses a training set to train a neural network (such as a convolutional neural network). The computing device may further use a validation set to determine whether the neural network meets a preset requirement (e.g., epochs of the detection model is equal or great than 1000). If the neural network meets the preset requirement, the neural network is determined as the detection model.

The detection model outputs the defect value of the enhanced image. The defect value represents a probability that the original image contains defects. A range of the defect value may be [0, 1].

In one embodiment, the computing device may further input each third sub-region image into the target model for detection.

In block S31, the computing device compares the defect value to a second threshold. If the defect value is greater than or equal to the second threshold, the process goes to block S32. If the defect value is less than the second threshold, the process goes to block S33.

A range of the second threshold can be (0, 0.5].

In block S32, the computing device determines that the original image contains defects (such as a misprinted character).

When the defect value is greater than or equal to the second threshold, the enhanced image is deemed to contain defects, so that the product in the original image is determined to be defective.

In block S33, the computing device determines that the original image contains no defect.

When the defect value is less than the second threshold, the enhanced image is deemed to contain no defect, so that the original image is determined to be flawless.

FIG. 1 describes in detail the image detection method of the present disclosure. Hardware architecture that implements the image detection method is described in conjunction with FIG. 2.

FIG. 2 is a block diagram of a computing device implementing the method in one embodiment of the present disclosure. The computing device 3 may include a storage device 31 and at least one processor 32. An image detection system 30 may be stored in the storage device 31 and executed by the processor 32. The processor 32 may execute the image detection system 30 to implement the blocks in the image detection method described above.

The computing device 3 may be a device that can perform processing according to preset or stored instructions, such as a desktop computer, a notebook, a palmtop computer, or a cloud server. Hardware of the computing device may include, but is not limited to, a microprocessor, an application-specific integrated circuit (ASIC), a field-programmable gate array (FPGA), a digital signal processor (DSP), an embedded device, etc.

Those skilled in the art will understand that computing device 3 is only an example, and does not constitute a limitation. Other examples of computing device 3 may include more or fewer components than shown in FIG. 2, or may combine some components, or may have different components.

The storage device 31 may be used to store the image detection system 30, and the processor 32 implements the computing device by running or executing the image detection system 30 or modules stored in the storage device 31 and calling up data stored in the storage device 31. The storage device 31 may include a storage area for programs and a storage area for data. The storage program area may store an operating system, and programs required by at least one function, etc.; the storage data area may store data and the like created in the use of the computing device 3. In addition, the storage device 31 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 32 may be a central processing unit (CPU) or other general-purpose processor, a digital signal processor (DSP), an application-specific integrated circuit (ASIC), a field-programmable gate array (FPGA) or other programmable logic device, a discrete gate, or a transistor logic device, or a discrete hardware component, etc. The processor 32 may be a microprocessor or any conventional processor. The processor 32 may be a control center of the computing device 3, and connect various parts of the entire computing device 3 by using various interfaces and lines.

In an exemplary embodiment, the image detection system 30 may be divided into one or more modules, and the one or more modules are stored in the storage device 31 and executed by the processor 32 to complete the method of the present disclosure. The one or more modules can be a series of computer-readable instruction segments capable of performing specific functions, and the instruction segments are used to describe execution processes of the image detection system 30 in the computing device 3.

When the modules integrated in the computing device 3 are implemented in the form of software functional units and used as independent units, they can be stored in a non-transitory readable storage medium. According to this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the blocks of the foregoing method embodiments. The computer-readable instructions include computer-readable instruction codes, and the computer-readable instruction codes can be source code, object code, an executable file, or in some other intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

Although not shown, the computing device 3 may also include a power source (such as a battery) for supplying power to various components. The power source may be connected to the at least one processor 32 through a power management device, so as to realize functions such as charging, discharging, and power consumption management. The power supply may also include direct current or alternating current power supplies, recharging devices, power failure detection circuits, power converters or inverters, and power status indicators. The computing device 3 may also include various sensors, BLUETOOTH modules, WI-FI modules, etc.

In several embodiments provided in the preset disclosure, it should be understood that the disclosed computing device and method may be implemented in other ways. For example, the embodiments of the computing device described above are merely illustrative. For example, the units are only divided according to logical function, and there may be other manner of division in actual implementation.

The modules described as separate components may or may not be physically separated, and the components displayed as modules may or may not be physical modules, that is, may be located in one or multiple places, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present but separate in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. An image detection method, comprising:
  obtaining an original image, and correcting the original image to obtain a corrected image;
  enhancing the corrected image to obtain an enhanced image, comprising:
    performing median filtering on the corrected image to obtain a filtered image;
    adjusting a contrast of the filtered image to obtain an adjusted image, comprising: obtaining a brightness histogram of the filtered image, a horizontal axis of the brightness histogram representing pixel value, and a vertical axis of the brightness histogram representing pixel quantity; setting a first threshold K; determining a pixel quantity $y_v$ corresponding to a pixel value v that is greater than the first threshold K according to the brightness histogram; obtaining a updated brightness histogram by calculating an updated pixel quantity $y'_v$ according to $$y'_v = \frac{\sum_{K<y_v}(y_v - K)}{256} + y_v,$$

wherein a horizontal axis of the updated brightness histogram represents pixel value, and a vertical axis of the updated brightness histogram represents updated pixel quantity; and using a histogram equalization algorithm to adjust the contrast of the filtered image according to the updated brightness histogram; and
  performing bilateral filtering on the adjusted image to obtain the enhanced image; and
  detecting defects in the enhanced image.

2. The method of claim 1, wherein correcting the original image comprises:
  obtaining a reference image without defects; and
  correcting the original image according to the reference image.

3. The method of claim 1, wherein performing median filtering on the corrected image comprises:
  sliding a sliding window in the corrected image, and updating pixel values of the corrected image according to the sliding window; and
  processing edges of the corrected image.

4. The method of claim 3, wherein using the histogram equalization algorithm to adjust the contrast of the filtered image according to the updated brightness histogram comprises:
  calculating a cumulative distribution function cdf(v); and
  using the cumulative distribution function cdf(v) to update the pixel value v to obtain an updated pixel value k v) as follows:

$$k(v) = \text{round}\left(\frac{cdf(v) - 1}{M \times N} \times 255\right),$$

wherein round denotes a round-off function, M denotes a width of the filtered image (e.g., 640), and N denotes a height of the filtered image.

5. The method of claim 3, wherein detecting defects in the enhanced image comprises:
  inputting the enhanced image into a pre-trained detection model to obtain a defect value of the enhanced image;
  comparing the defect value with a second threshold;
  determining that the original image contains defects when the defect value is greater than or equal to the second threshold; and
  determining that the original image contains no defect when the defect value is less than the second threshold.

6. A computing device comprising:
  at least one processor; and
  a storage device storing computer-readable instructions, which when executed by the at least one processor, cause the at least one processor to:
  obtain an original image, and correct the original image to obtain a corrected image;
  enhance the corrected image to obtain an enhanced image, comprising:
    perform median filtering on the corrected image to obtain a filtered image;
    adjust a contrast of the filtered image to obtain an adjusted image, comprising: obtaining a brightness histogram of the filtered image, a horizontal axis of the brightness histogram representing pixel value, and a vertical axis of the brightness histogram representing pixel quantity: setting a first threshold K; determining a pixel quantity $y_v$ corresponding to a pixel value v that is greater than the first threshold K according to the brightness histogram; obtaining a updated brightness histogram by calculating an updated pixel quantity $y'_v$ according to $$y'_v = \frac{\sum_{K<y_v}(y_v - K)}{256} + y_v,$$

wherein a horizontal axis of the updated brightness histogram represents pixel value, and a vertical axis of the updated brightness histogram represents updated pixel quantity; and using a histogram equalization algorithm to adjust the contrast of the filtered image according to the updated brightness histogram; and perform bilateral filtering on the adjusted image to obtain the enhanced image; and detect defects in the enhanced image.

7. The computing device of claim 6, wherein the at least one processor is further caused to:
obtain a reference image without defects; and
correct the original image according to the reference image.

8. The computing device of claim 6, wherein the at least one processor is further caused to:
slide a sliding window in the corrected image, and update pixel values of the corrected image according to the sliding window; and
process edges of the corrected image.

9. The computing device of claim 8, wherein the at least one processor is further caused to:
calculate a cumulative distribution function cdf(v); and
use the cumulative distribution function cdf(v) to update the pixel value v to obtain an updated pixel value k(v) as follows:

$$k(v) = \text{round}\left(\frac{cdf(v) - 1}{M \times N} \times 255\right),$$

wherein round denotes a round-off function, M denotes a width of the filtered image (e.g., 640), and N denotes a height of the filtered image.

10. A non-transitory storage medium having stored thereon computer-readable instructions that, when the computer-readable instructions are executed by a processor to implement the following method:
obtaining an original image, and correcting the original image to obtain a corrected image;
enhancing the corrected image to obtain an enhanced image, comprising:
performing median filtering on the corrected image to obtain a filtered image;
adjusting a contrast of the filtered image to obtain an adjusted image, comprising: obtaining a brightness histogram of the filtered image, a horizontal axis of the brightness histogram representing pixel value, and a vertical axis of the brightness histogram representing pixel quantity; setting a first threshold K; determining a pixel quantity $y_v$ corresponding to a pixel value v that is greater than the first threshold K according to the brightness histogram; obtaining a updated brightness histogram by calculating an updated pixel quantity $y'_v$ according to $$y'_v = \frac{\sum_{K<y_v}(y_v - K)}{256} + y_v,$$

wherein a horizontal axis of the updated brightness histogram represents pixel value, and a vertical axis of the updated brightness histogram represents updated pixel quantity; and using a histogram equalization algorithm to adjust the contrast of the filtered image according to the updated brightness histogram; and performing bilateral filtering on the adjusted image to obtain the enhanced image; and detecting defects in the enhanced image.

11. The non-transitory storage medium of claim 10, wherein correcting the original image comprises:
obtaining a reference image without defects; and
correcting the original image according to the reference image.

12. The non-transitory storage medium of claim 10, wherein performing median filtering on the corrected image comprises:
sliding a sliding window in the corrected image, and updating pixel values of the corrected image according to the sliding window; and
processing edges of the corrected image.

13. The non-transitory storage medium of claim 12, wherein using the histogram equalization algorithm to adjust the contrast of the filtered image according to the updated brightness histogram comprises:
calculating a cumulative distribution function cdf(v); and
using the cumulative distribution function cdf(v) to update the pixel value v to obtain an updated pixel value k(v) as follows:

$$k(v) = \text{round}\left(\frac{cdf(v) - 1}{M \times N} \times 255\right),$$

wherein round denotes a round-off function, M denotes a width of the filtered image (e.g., 640), and N denotes a height of the filtered image.

* * * * *